US007973649B2

(12) United States Patent
DeMille

(10) Patent No.: US 7,973,649 B2
(45) Date of Patent: Jul. 5, 2011

(54) METHOD OF AN APPARATUS FOR SENSING THE UNAUTHORIZED MOVEMENT OF VEHICLES AND THE LIKE AND GENERATING AN ALARM OR WARNING OF VEHICLE THEFT

(75) Inventor: Rod DeMille, Sudbury, MA (US)

(73) Assignee: Lojack Operating Company LP, Westwood, MA (US)

( * ) Notice: Subject to any disclaimer, the term of this patent is extended or adjusted under 35 U.S.C. 154(b) by 2712 days.

(21) Appl. No.: 10/241,259

(22) Filed: Sep. 10, 2002

(65) Prior Publication Data

US 2010/0277296 A1   Nov. 4, 2010

(51) Int. Cl.
*B60R 25/10* (2006.01)
(52) U.S. Cl. .............. 340/426.12; 307/10.2; 340/426.17
(58) Field of Classification Search .. 340/426.1–426.26, 340/429, 825.31, 5.61–5.7; 307/10.2
See application file for complete search history.

(56) References Cited

U.S. PATENT DOCUMENTS

| 4,818,998 | A | | 4/1989 | Apsell et al. | |
|---|---|---|---|---|---|
| 4,908,629 | A | | 3/1990 | Apsell et al. | |
| 5,247,279 | A | * | 9/1993 | Sato | 340/426.17 |
| 5,315,285 | A | * | 5/1994 | Nykerk | 340/426.23 |
| 5,434,559 | A | * | 7/1995 | Smiley et al. | 340/571 |
| 5,479,156 | A | * | 12/1995 | Jones | 340/5.64 |
| 5,604,384 | A | * | 2/1997 | Carlo et al. | 307/10.5 |
| 5,917,423 | A | | 6/1999 | Duvall | |
| 6,121,891 | A | * | 9/2000 | Hwang | 340/561 |
| 6,662,099 | B2 | * | 12/2003 | Knaian et al. | 701/117 |
| 6,677,851 | B1 | * | 1/2004 | Losey | 340/5.62 |
| 2001/0009337 | A1 | * | 7/2001 | Ueno et al. | 307/10.1 |

* cited by examiner

*Primary Examiner* — Brent Swarthout
(74) *Attorney, Agent, or Firm* — Iandiorio Teska & Coleman

(57) ABSTRACT

An improved motion sensing and alarm technique and apparatus for monitoring unauthorized movement of vehicles or the like and notifying the owner thereof, wherein the motion sensors in the vehicle are microprocessor controlled to be automatically armed when the owner is not in the vicinity of the vehicle, but disarmed or de-activated in the presence of the owner and the owner's radio-coded identification transmitter associated with the owner's key fob, and with energy saving features as well.

21 Claims, 11 Drawing Sheets

METHOD OF AN APPARATUS FOR SENSING THE UNAUTHORIZED MOVEMENT OF VEHICLES AND THE LIKE AND GENERATING AN ALARM OR WARNING OF VEHICLE THEFT

FIELD OF INVENTION

The invention relates generally to improvements in the sensing of unauthorized movement of vehicles and the like and generating an alarm or warning of vehicle misuse tampering or theft; being more specifically, though not exclusively, concerned with alerting the vehicle owner or others of such sensing in order to initiate police or other vehicle tracking and recovery operations as described, for example, in U.S. Pat. Nos. 4,818,998 and in 4,908,629 and provided by the LoJack® system of the assignee of the present invention and also described in, for example, the assignee's 1989 brochure entitled "LoJack Stolen Vehicle Police Recovery Network."

BACKGROUND

As described in said patents and publication, upon receiving notice of the unauthorized movement of an owner's vehicle equipped with such a "LoJack" or similar system, the owner so notifies the police or other recovery authority to put in operation the vehicle-installed transponder that is then activated to transmit radio-tracking signals to the police or others for tracking the stolen vehicle for recovery of the same.

Earlier systems for automatically sensing the unauthorized tampering, use, or more generally the movement of the vehicle include, for example, that described in earlier U.S. Pat. No. 5,917,423 of said assignee.

While the above-referenced theft recovery techniques are widely and highly successfully in use, permitting recoveries by the police and up to about five hours of notification on the average, they cannot be put into tracking-recovery operation until there is actual notification that the vehicle is missing. The present invention, accordingly, is directed toward shortening the time that it takes to alert the owner of unauthorized movement of the vehicle, being concerned with improved motion sensing and automatic generation of an alarm or warning of vehicle theft.

OBJECTS OF INVENTION

The primary object of the present invention, therefore, is to provide a new and improved method of and apparatus for sensing the unauthorized movement of vehicles and the like and more quickly generating an alarm or warning to the owner or others of such vehicle theft.

Other and further objects will be explained hereinafter and are more particularly delineated in the appended claims.

SUMMARY

In summary, however, from one of its important viewpoints, the invention embraces a method of unauthorized vehicle motion sensing and alarm with the aid of in-vehicle acceleration sensors, that comprises, monitoring the presence or absence of predetermined periodic radio-frequency pulse transmissions from an authorized source in the vicinity of the vehicle; in the event that such transmissions are present, receiving the transmissions in the vehicle and disarming or de-activating the acceleration sensors; in the absence of such reception, arming or activating the acceleration sensors in the vehicle to test for any acceleration of the vehicle by unauthorized motion thereof over predetermined time period samples; in the event such vehicle acceleration is detected by the acceleration sensors, sending a wireless alarm message to a host communication system for so informing the vehicle owner; after a further predetermined longer period of time during said activating of the acceleration sensors wherein no motion of the vehicle has been detected, disarming or de-activating the acceleration sensors to put them in a sleep mode and conserve activation energy; upon the advent of vibration detection at the vehicle during such sleep mode, awakening and rearming or re-activating the acceleration sensors; and again disarming or de-activating the acceleration sensors upon the later advent of the reception of said transmissions in the vehicle.

In the preferred implementation of this technique, it is desirable that the owner or customer carry the radio-frequency transmitter on a keychain or key fob or the like (hereinafter generically called "key fob") to interact with the receiver circuit in the motion-sensing alarm circuit installed in the vehicle along with its host "LoJack" or other radio alarm and transponder tracking system. Upon vehicle acceleration detection, a trigger signal is sent to the vehicle communication module such as the LoJack or other transponder device which then sends the wireless alarm.

The sensor of the invention alarm system utilizes two orthogonal-axis microprocessor-controlled accelerometer sensors, which have been found fortuitously to be capable of sensing motion not only forward and aft and right and left, but also up and down—actually on a three-dimensional axis basis. In practice, indeed, it has been discovered that in encountering the irregularities of roads and in responding to turns, the vehicle actually develops components of motion along the third axis, such that only two perpendicularly oriented accelerometers are required serendipitously to cover all directions of motion of the vehicle. A further benefit of this resides in the enabling of any monitoring installation orientation—a significant advantage in practice.

When the customer or owner with the key fob transmitter comes into the vicinity of the vehicle, locally transmitting radio-frequency pulses, such will be received in the receiver of the vehicle sensor monitor and will thereupon disarm or de-activate the accelerometer sensors, since they no longer need to be on the watch for theft. If, after a predetermined number of minutes of time period samples, however, the receiver does not detect the owner or customer transmissions in its vicinity, the receiver re-arms the accelerometer sensors as will later be more fully described.

If, moreover, over a relatively longer period of time, say, for example, for 10 minutes, there is no acceleration sensed, reflecting the fact that the vehicle is stationary and there is no motion, the microprocessor preferably disconnects the acceleration sensors from the vehicle battery from which they are powered, to put the sensors "to sleep", conserving battery power. A piezo strip, however, is provided that continuously monitors vibration while drawing negligible current (something of the order of tens of microamps), and, upon the slightest vibration of the vehicle, senses such and wakes-up the microprocessor again to power the accelerometer sensors.

Should the customer lose the key fob transmitter or fail to maintain its battery (of life preferably about a year), it is desirable not to continue the accelerator sensor powering since this would be transmitting meaningless nuisance cycles. Accordingly, if, after a much longer period, say about 8 hours, no owner- or customer-transmitted radio pulses are received, the whole system goes "to sleep" or goes dormant until the owner again approaches the vehicle so that the key fob transmitted radio pulses are again present in the vehicle vicinity and are thus again received by the vehicle receiver, reactivating the sensors and normal operation is resumed.

A test mode is also provided including with flashing lights, which can be requested by the host device, such as a cell phone, radio pager or "LoJack" system, etc., which becomes activated when an alarm signal is produced, but which also can request the microprocessor of the sensor system to cycle through test procedures.

In further summary, the purpose of the invention, indeed, is efficiently to reduce the undetected theft time of current recovery operations.

Preferred and best mode embodiments and designs for the practice of the invention are later detailed.

DRAWINGS

The invention will now be described with reference to the accompanying drawings, FIG. 1 of which is a schematic circuit diagram of a preferred motion sensor operating in accordance with the principles of the invention;

Figure 5:
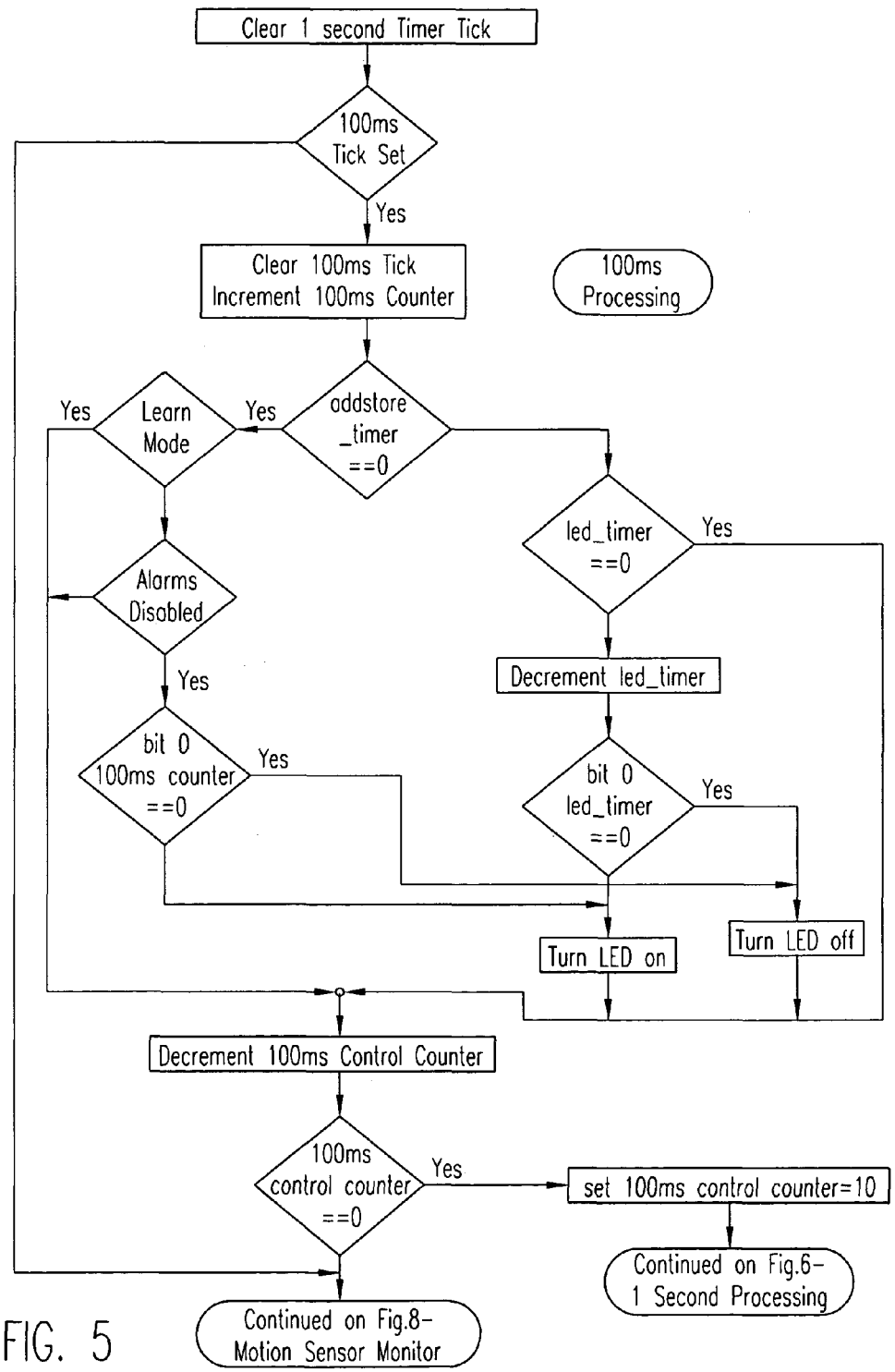
Figure 6:
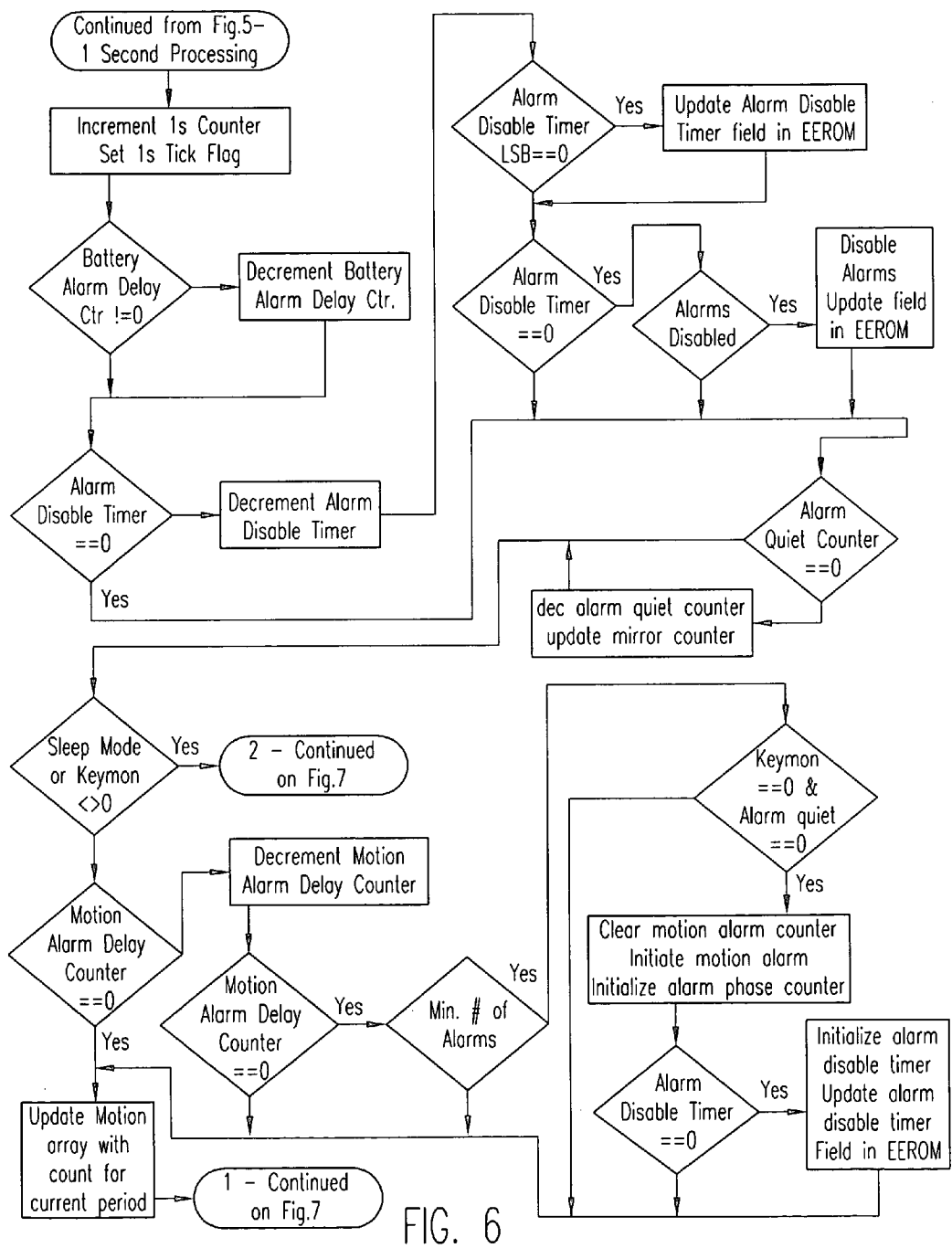
Figure 7:
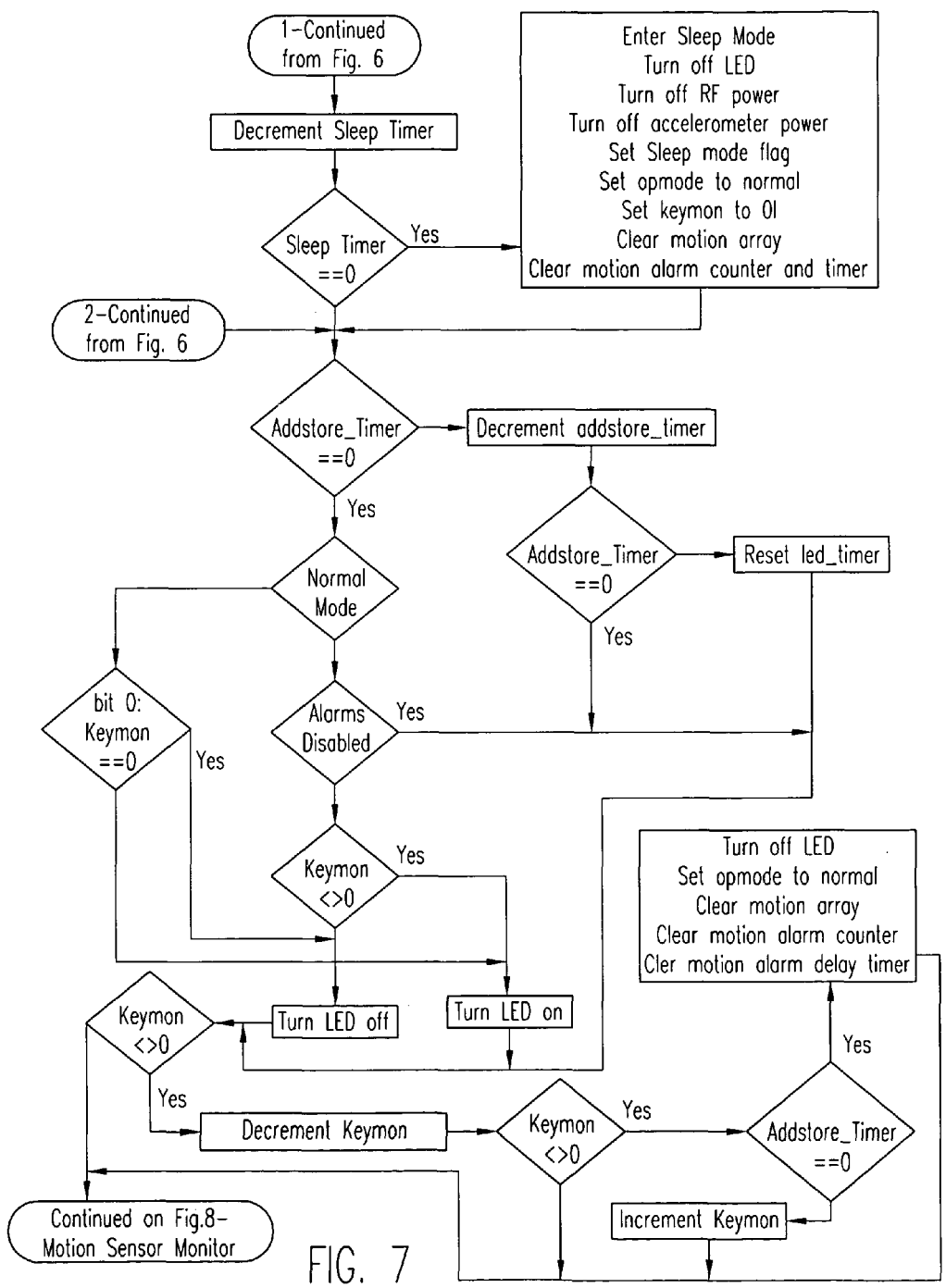
Figure 8:
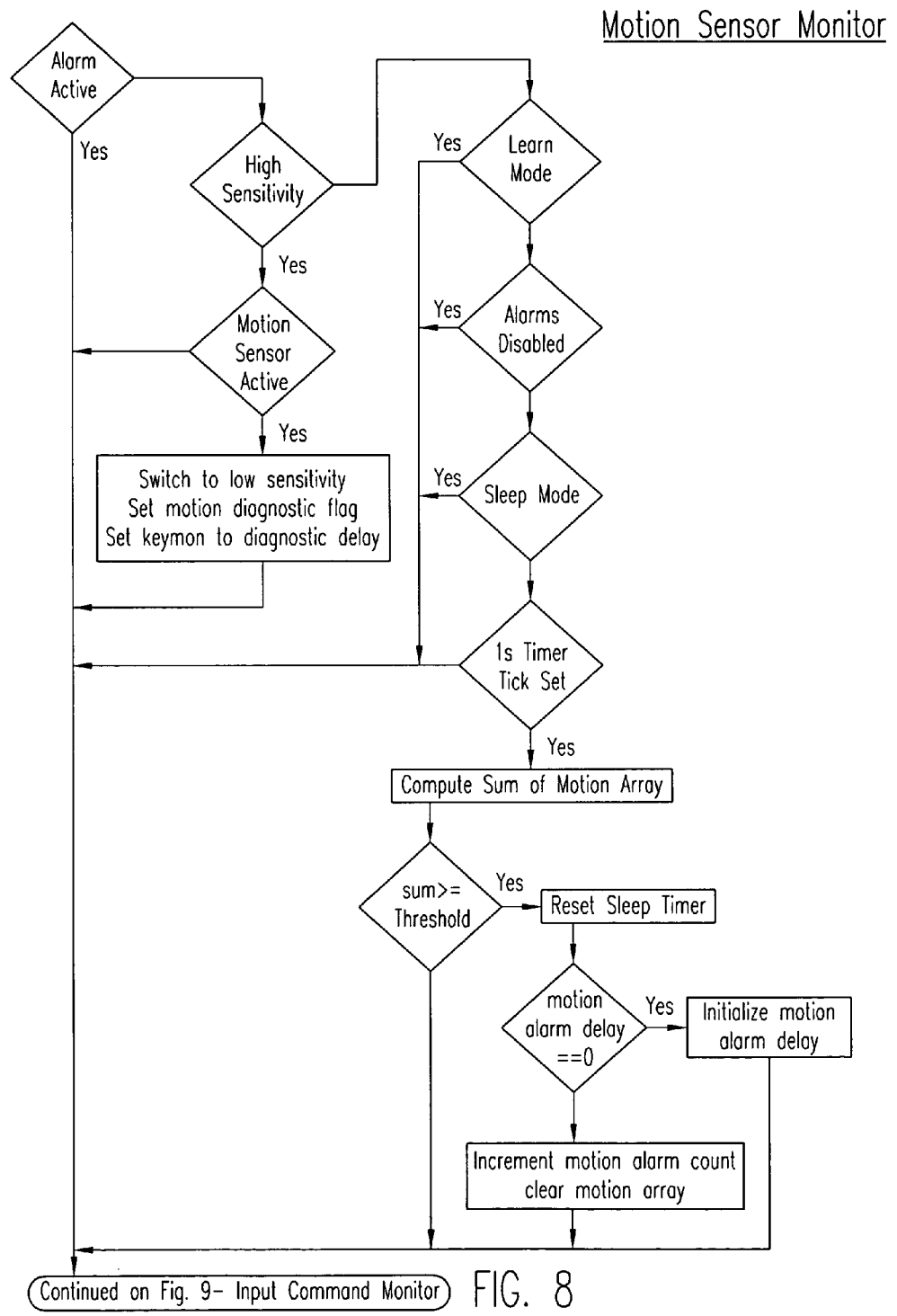
Figure 9:
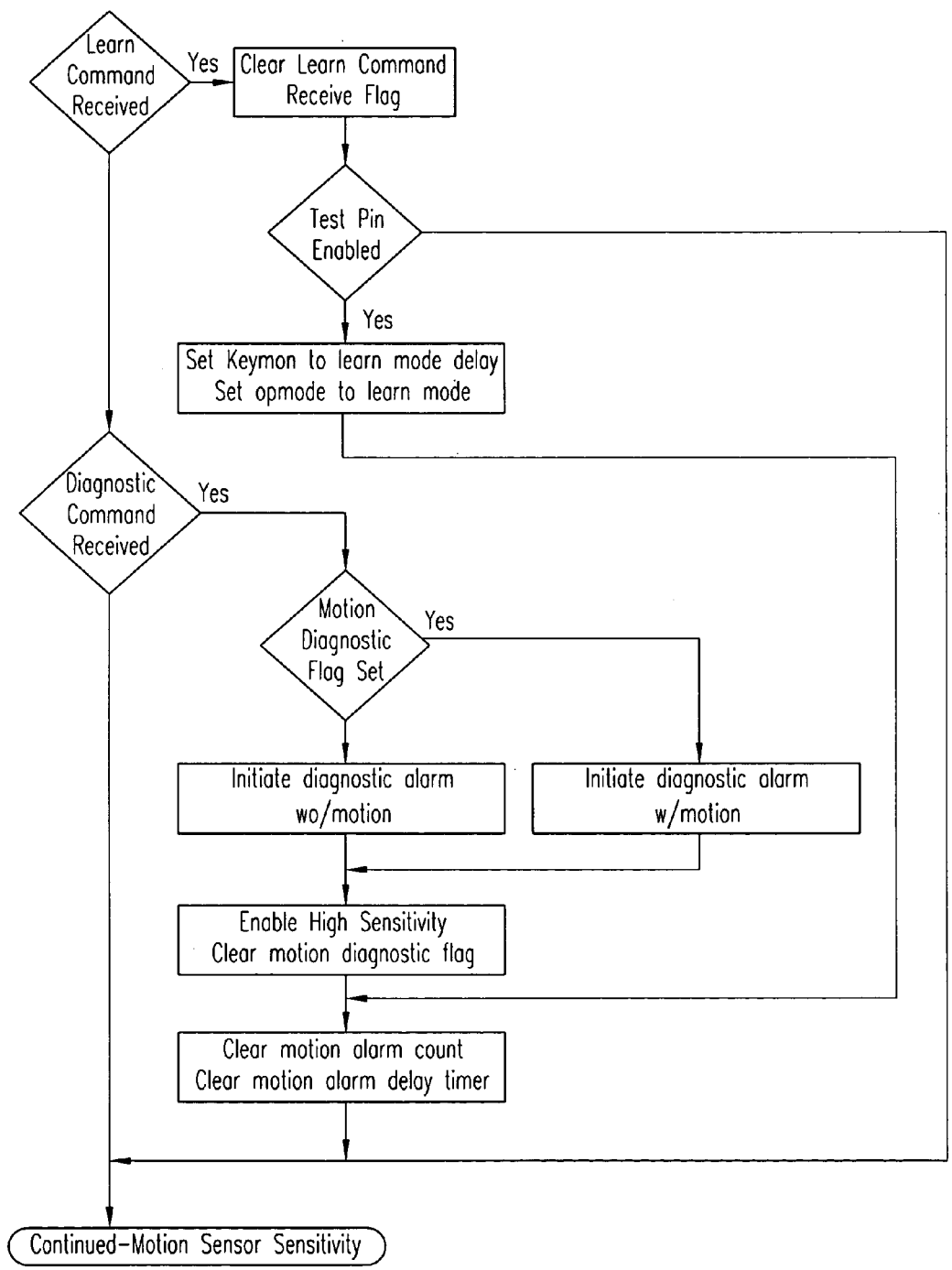

FIGS. 5 and 6-7 are respectively similar diagrams detailing the alarm timer processing control operation during exemplary 100 ms (millisecond) and one (second) processing; and FIGS. 8 and 9 are similar flow diagrams of the motion sensing monitoring and input command monitoring, respectively.

DESCRIPTION OF PREFERRED EMBODIMENT(S) OF THE INVENTION

Figure 1A:
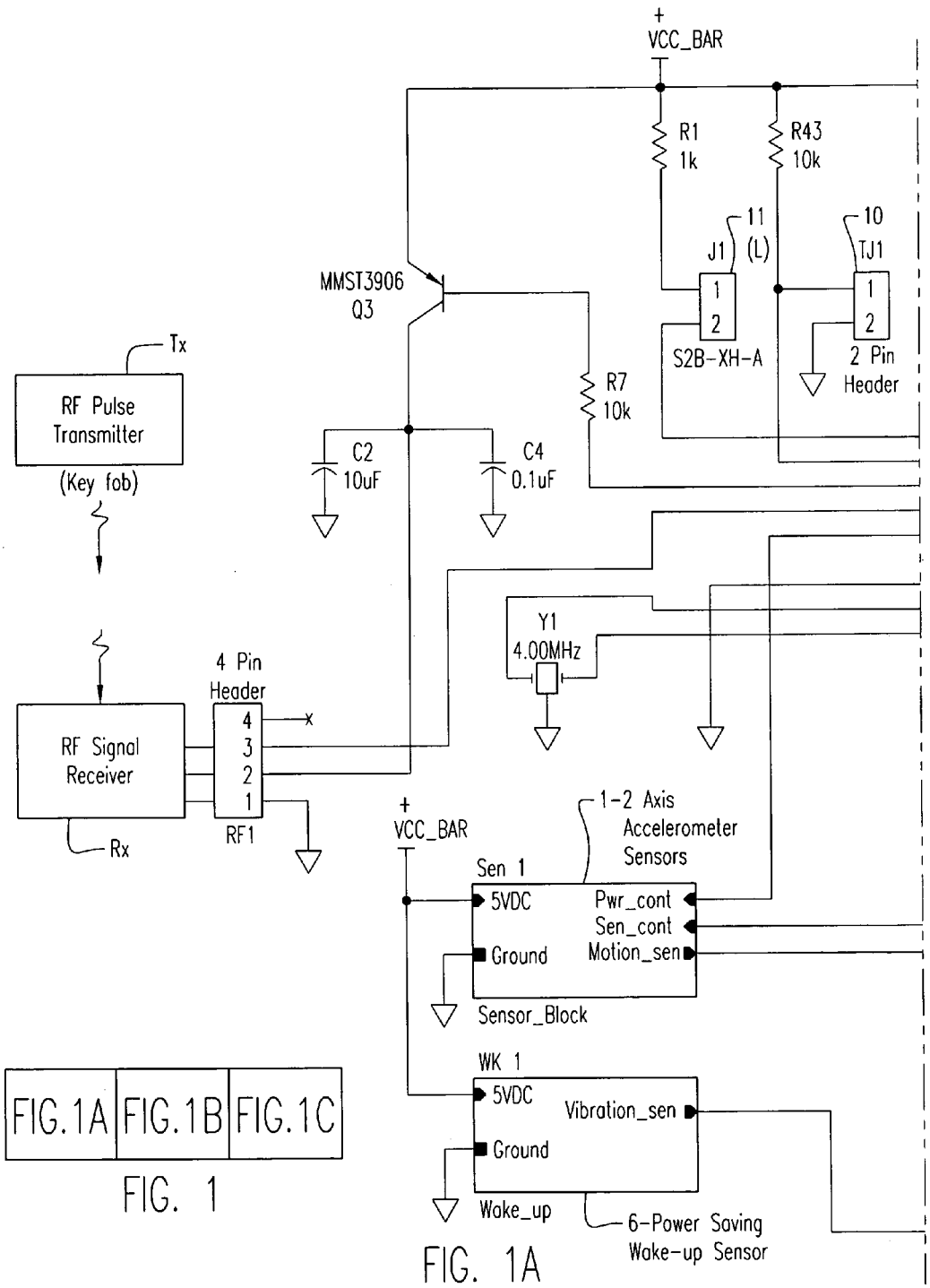
Figure 1B:
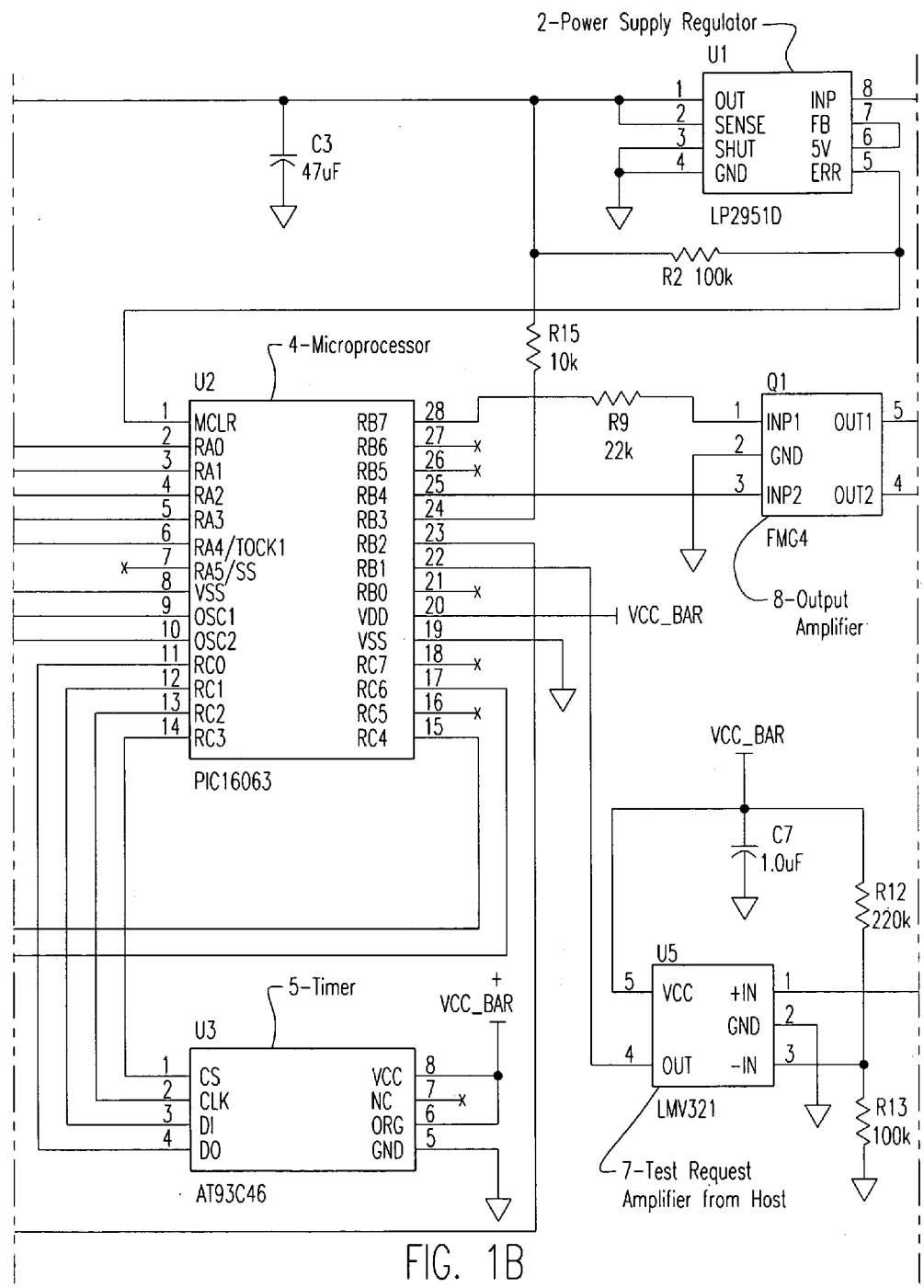
Figure 1C:
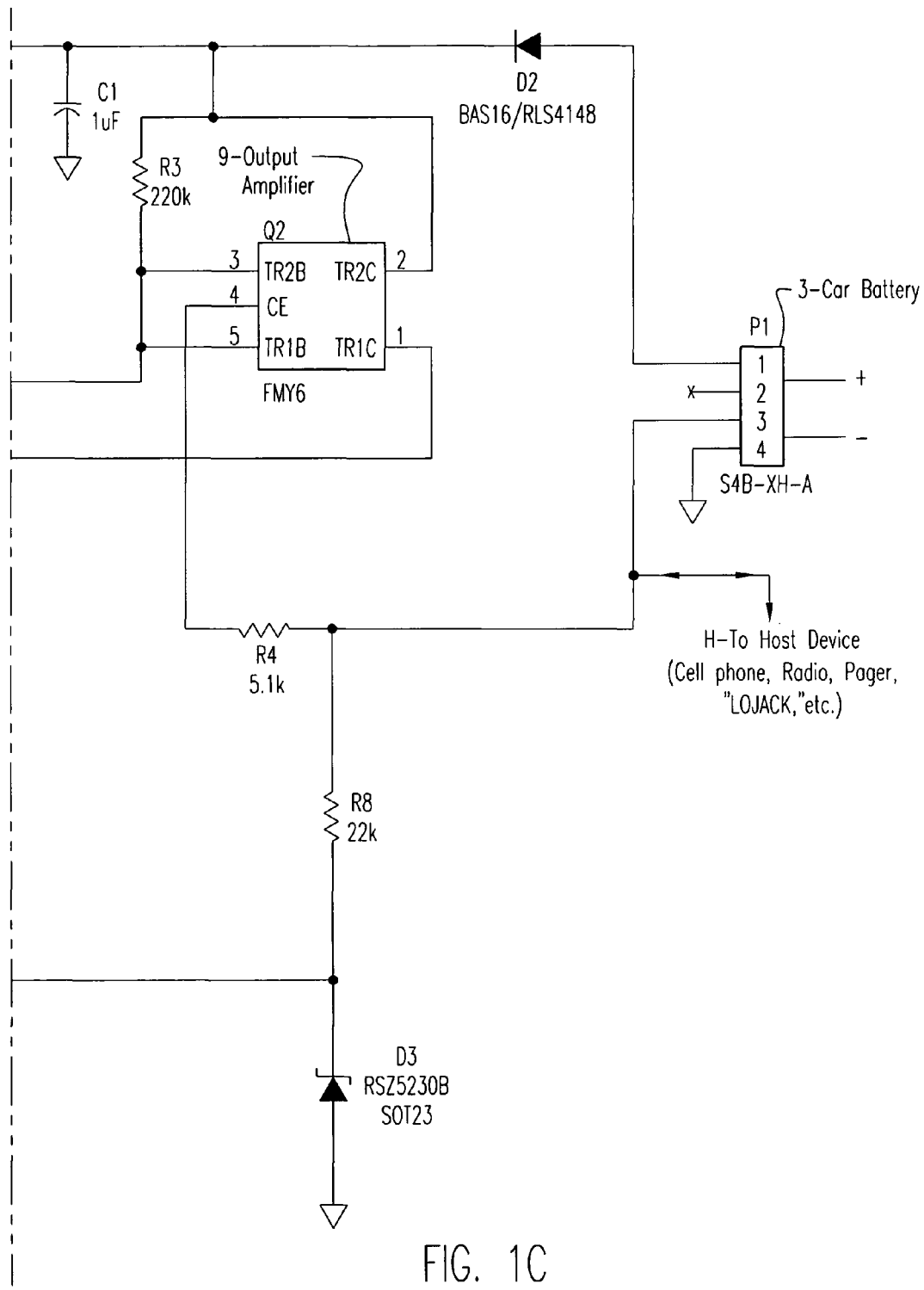

Referring first to the overall system diagram FIG. 1, the orthogonal pair of accelerator sensors is shown in the two-axis accelerometer sensor block 1, powered by a regulated power supply 2 from the vehicle battery 3, and represented by the plus terminal + (5V DC), with the other terminal being grounded. The microprocessor is shown at 4, and the various timing controls are illustrated at 5 for the monitoring wake-up and arming-disarming or activation-de-activation times previously mentioned and hereinafter discussed in detail. The power-saving wake-up sensor is shown generally at 6. The previously described function of enabling the host device to request testing procedures by the microprocessor 4 is shown at 7. The radio-frequency pulse transmitter, perhaps on the key fob as earlier described and which the customer carries, is shown at TX, and the receiver for receiving those transmitted pulses is shown as part of the monitor system in the vehicle at RX. Typical frequencies for the transmitter and receiver are, for example, of the order of 433 MHz. Output amplifiers controlled by the microprocessor 4 for the developing and sending of alarm signals to the host device at H, are shown at 8 and 9, respectively.

Provision is made for a temporary 'jumper' connection at 10 for programming codes during the manufacturing process. Provision is also made for a temporary test lamp or Light Emitting Diode (LED) at 11. This LED can be used to assist in the installation and test of the motion sensor device.

Figure 2:
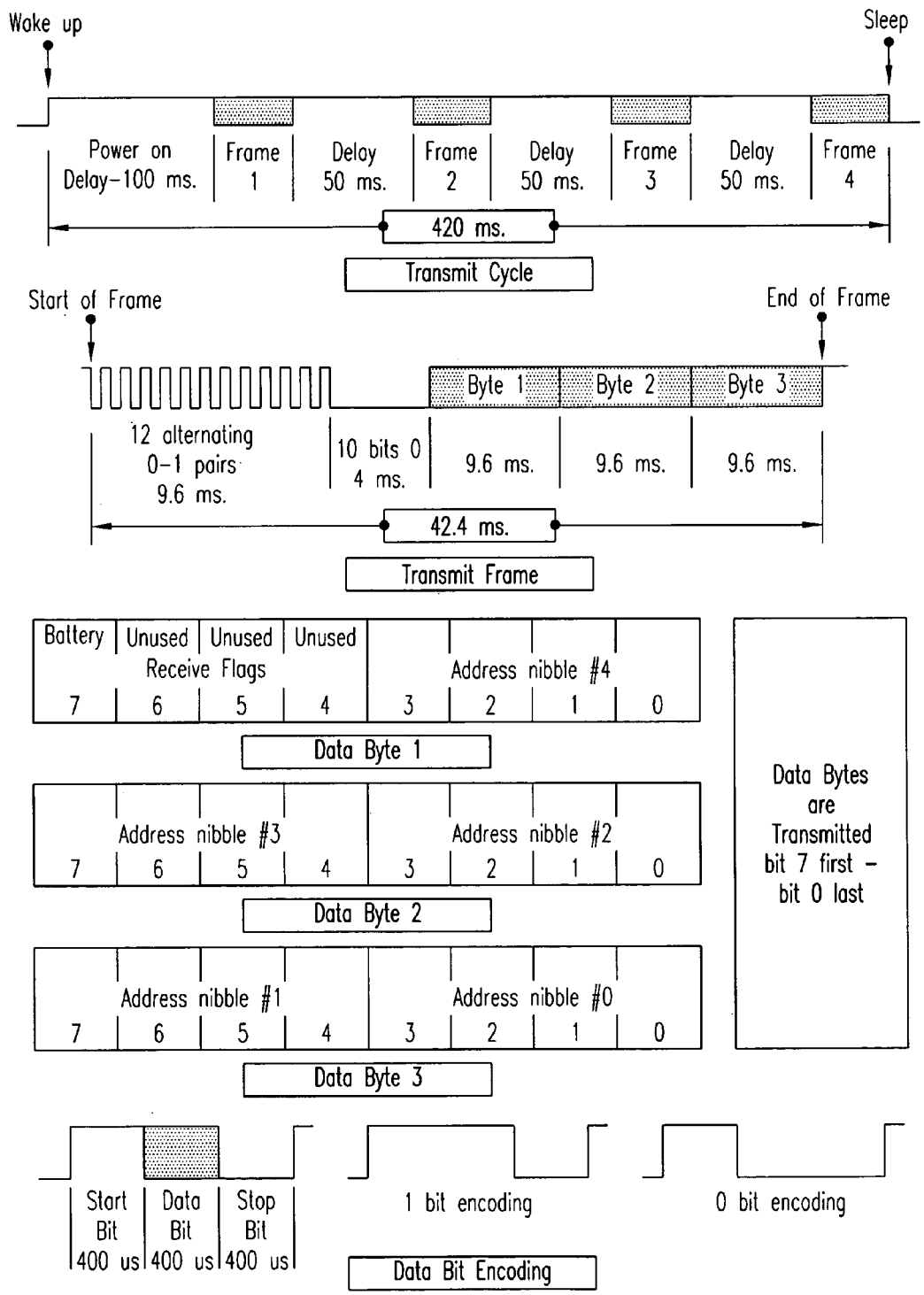
FIG. 2 is a timing chart of radio-frequency data byte transmission for use in the arming or de-activating of the motion sensor installed in the vehicle.

The operation of this system, including the various before-mentioned functions, will now be described with reference first to the timing chart of FIG. 2, which illustrates a typical and preferred series of transmit cycles and frames for various data bytes involved in the reception and addressing required for generating the sequence of transmitted radio-frequency pulses.

When power is applied to the microprocessor, a modulated pulse signal is provided to the radio-frequency amplifier circuit in the transmitter TX of FIG. 1. A modulated pulse signal consists preferably of an array of sub-pulses designed to repeat themselves, illustratively shown as four times, so that the exact transmission period is, for example 420 milliseconds, as shown at the top of FIG. 2, consisting of four frames including 50 millisecond delays between each frame. That 420 millisecond cycle is repeated once every approximately 90 seconds. The frame itself is shown consisting of a 42.4 millisecond period that in turn consists of 12 alternating pairs separated by 4 milliseconds, followed by three 9.6 millisecond signals transmitting data byte 1, byte 2 and byte 3; the bottom lines of FIG. 2, showing the detail of the management of that cycle time and that processing.

Figure 3:
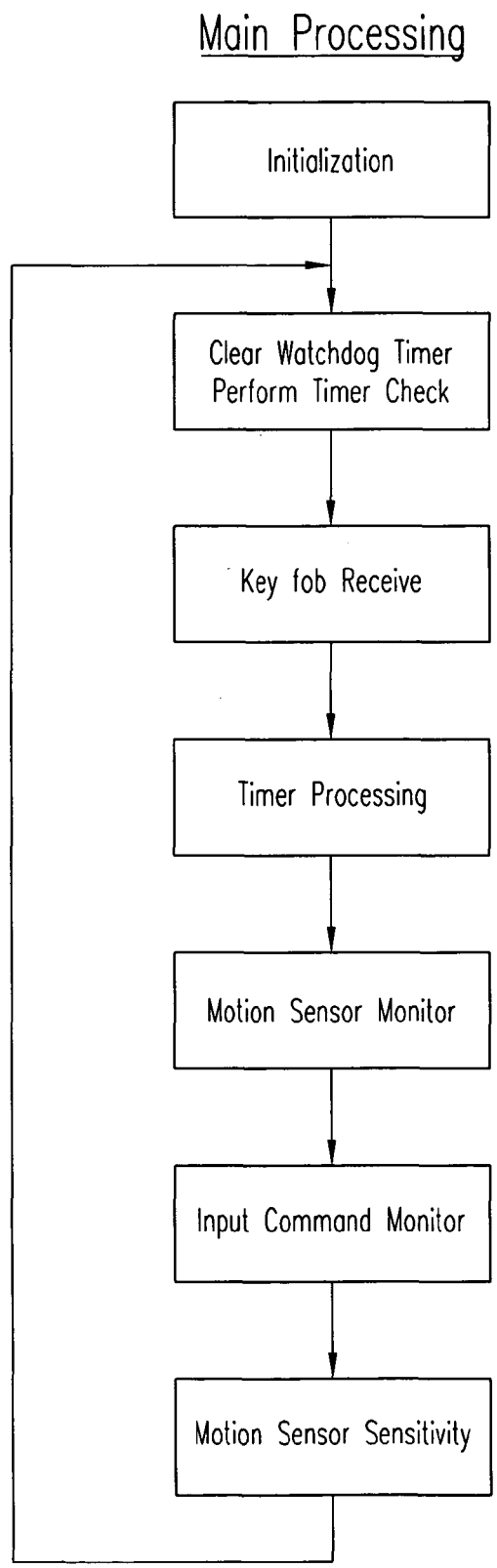
FIG. 3 is an overall chart of the main processing of the microprocessor control of the sensing.

An overall main processing flowchart is provided in FIG. 3 for the processor in the vehicle-mounted motion sensor module itself, as opposed to the processor that is in the key fob.

FIG. 3 shows an overview of the main processing, starting when the circuit gets powered from the battery voltage at 3, FIG. 1, and goes through an initialization sequence, performing well-known housekeeping, such as to clear the customary watchdog timer and perform some timer checks. It then goes into a mode where it is listening for receipt of the key fob radio transmitted signals in its vicinity, monitoring the receiver output at RX. Upon receiving such a transmitted signal, it performs some timer processing, so-labeled, and then determines whether it is going to monitor the input command circuit or the motion sensor sensitivity circuit of FIG. 3. This is the normal overhead or flow of the software that is in the microprocessor 4.

Figure 4:
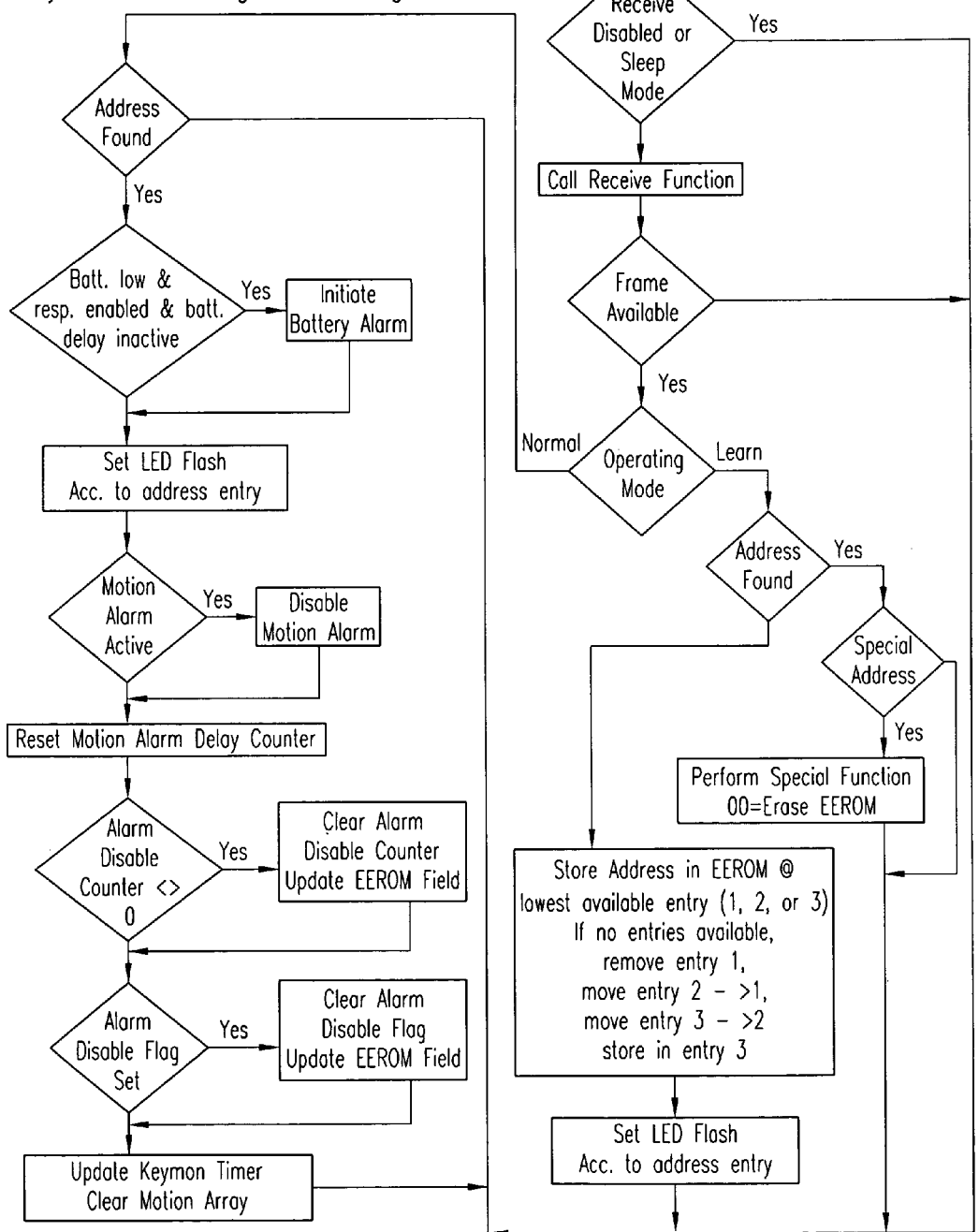
FIG. 4 is a flow diagram of the details of the microprocessor-controlled steps in the receiving process at the vehicle.

The key fob transmissions from TX, FIG. 1, are received and processed as in FIG. 4, with the motion sensor receiver spending its time determining if it is receiving key fob transmissions. If not, it just bypasses the sequences of FIG. 4 and goes to the continue mode at the bottom thereof. When it does receive such a signal, however, it validates the signal, determining that the signal is of the code that it is looking for (FIG. 2), as is well-known, and then determining that its address has been found at "Address Found".

It also goes through a check to see if the signal coming from the transmitter TX is also capable of sending a low battery warning of its own ("Batt. Low"), indicating that the battery in the key fob transmitter TX needs to be replaced. If that signal is received, and if the low battery response is enabled, then a special trigger alert is sent to the host module H, FIG. 1. If connected at 11, the indicating LED will flash according to the address entry.

If a normal command is received, and the motion alarm is active, the motion sensing is disabled ("Alarm Disable"). Then the circuit will continue to monitor for the presence of the key fob transmitter in the vicinity.

Each time the motion alarm is disabled, the motion alarm delay counter is reset. This counter inhibits motion sensing for the next 5 minutes. Some minor housekeeping is then performed on the Alarm Disable Counter, the Alarm Disable Flag, the keymonitor timer and motion detection array. FIG. 4 also illustrates the LEARN mode of operation. Learn mode is performed during the manufacturing process and is enabled by connecting the jumper wire at 10. Upon entering the learn mode, FIG. 4 illustrates that a special address is available that performs a special function to erase the previously learned codes. If the special address is not received, the received code will be programmed into the microprocessor memory. Up to 3 codes may be learned. The LED flashes according to the code entry learned.

FIG. 5 illustrates that, in the absence of receipt of a local radio-frequency signal from the transmitter TX, the motion sensor is now armed or activated as was shown in FIG. 4. Once the motion sensor 1 of FIG. 1 is armed, the outputs of the accelerometer devices are monitored and their output signals at 8 and 9, FIG. 1, will determine if the vehicle is in motion by sampling the output from those accelerometer devices, at say, a 100 millisecond period rate. For each 100 millisecond period, if there is motion, it is so noted in the microprocessors memory.

If the 100 Ms Tick is not set, the complete 100 ms timer processing is bypassed. If the tick is set, it is immediately incremented. Next, a 100 millisecond delay is generated by the microprocessor. The LED timer is reset and decremented. The LED is turned either on, or off, depending on the microprocessor commands. The LED flashes at the 100 ms rate for various cycles indicating system status. If not in learn mode, and the alarms are disabled, the 100 ms counter is reset to 0. If in learn mode, or Alarms are not disabled, the 100 ms control counter is decremented. The control counter is decremented from a value of 10. Once the control counter is decremented to 0, one full second has elapsed and control is passed to the 1 second processing illustrated in FIG. 6.

In FIG. 6, the monitoring of the accelerometer 1 at the 100 millisecond periods is measured over a one second interval. An algorithm is used providing that if motion is detected for more than half the timing of the hundred millisecond samples over such a one second period, then it is considered that such is a trigger event. Otherwise, these one second timer processing periods are just continuously sampled. Each one second period is thus disabled upon the presence of at least 500 milliseconds of tested samples of FIG. 5.

FIG. 7 is a continuation of FIG. 6 as to the one second processing of FIG. 5, above explained. The detail in FIG. 7 deals with whether or not to enter the "sleep" mode. The "sleep" mode is entered when there is no output from the accelerometer devices at 1 in FIG. 1, for a longer period of more than, say, 10 minutes. After 10 minutes, the accelerometer will go into a low current mode and the power is disconnected by the microprocessor 4. The other function occurring in FIG. 7 is that, after the elapse of still a much longer time period, say 8 hours, in not detecting the presence of the transmitter TX, then this system goes into a dormant mode, so as to not broadcast nuisance signals, as before mentioned. This system will, however, automatically reactivate itself when it again receives the appropriate radio signals in the vicinity of the transmitter TX.

At the bottom of the one-second timer processing of FIG. 6, there is shown a delay period waiting for the motion sensor to be actively looking at the output of the accelerometer devices; for example, a delay period of five minutes. That period of time, again under the control of the timer 5 of FIG. 1, is a period of time during which this system is waiting for transmissions of the radio-frequency pulses from the key fob transmitter TX, and it is a safety delay, such that, in the case of the presence of radio-frequency interference, or other signal blocking, this system will be given plenty of opportunity to receive the transmitter pulses being sent once every 90 seconds from the transmitter TX.

FIG. 6 further illustrates that control of the system is taken from the 100 ms timer processing of FIG. 5 and as labeled, 1 second processing commences. Immediately, the 1 second timer is incremented and the 1 second tick flag is set. If the Low Battery alarm is being processed, there is no need for any alarm delay so the Battery Alarm Delay Counter is tested for 0 and the Battery Alarm Delay Counter is decremented if not 0. Next the alarm disable timer is tested for 0 value. If it is zero, processing continues to test the Alarm Quiet Counter. If the Alarm Quiet Counter is not 0 it is also decremented. The alarm disable feature is provided to eliminate rouge devices from transmitting nuisance signals. If the alarm disable timer is not 0, this value is decremented until an 8 hour period has expired without any receipt of valid transmitter codes. When this Alarm Disable mode is entered the status is updated in the Disabled Timer field in EE ROM. Also illustrated in FIG. 6 is the Low Power Sleep Mode. This mode is set after 10 minutes of motion sampling and observing no motion. When not in sleep mode, the motion alarm delay counter is tested for 0 and decremented if not 0. This counter is provided to wait for a grace period for receipt of a valid code from the Key Fob Transmitter. This grace period is set for 5 minutes. At the bottom of FIG. 6, the sequence of sending an alarm is initiated. One final test of the Alarm Disable Timer is performed. This is conditioned by testing the keyfob monitor bit, indicating that the keyfob is not present, and alarm is not in quiet mode. FIG. 7 is a continuation of FIG. 6 and illustrates the final steps prior to entering sleep mode. Sleep mode occurs when the sleep timer=0. Once sleep mode is entered, either from 1 or 2 from FIG. 6, the add Store Timer is monitored for a value of 0. If this is 0, additional testing is performed on the status of the 'Normal Mode', 'Alarms Disable', and Key Monitor bits. Receipt of the Transmitted keyfob signal will update the status of the key mon bits and the LEDs will flash accordingly. When key mon is 0, operation is transferred to the Motion Sensor Monitor illustrated in FIG. 8. When the key mon is not 0, it is decremented and the addstore timer is tested. If the addstore timer is 0, certain actions are performed by the microprocessor. Operation then continues to the motion sensor monitor in FIG. 8.

FIG. 8 illustrates the handling of the motion sensor monitor, specifically for a test mode when the alarm is active and a test is requested by the host device H. Any small movement of the vehicle, sensed by the before-mentioned accelerometer sensor will cause the motion sensor to validate or verify to the host device that the motion sensor is functioning. In FIG. 1, a left-pointing arrow is shown at the host device H, to indicate that the host device is going to give such a request. Its request signal is amplified by the test request amplifier 7 of FIG. 1 and then that request is communicated to the microprocessor at 4; this is when the high sensitivity mode is entered. The resulting test is then communicated back to the host device through the output amplifiers 8 and 9 (right-pointing arrow at H).

Another function shown in FIG. 8 is a learn mode so that when the unit is first manufactured, it may learn the appropriate code of the key fob transmitter TX—each owner or customer key fob transmitter having its own unique code so that no owner or customer will disable another customer's motion sensor. FIG. 8 also shows monitoring whether this system is in such a learn mode or in the disable mode or in the sleep mode, so-labeled, handling an array of overhead functions.

Any time the system goes into the Low Power 'Sleep Mode' it will remain in that mode until the piezo strip in FIG. 1 encounters any small vibration, such as an operator, authorized or otherwise, even opens the door of the vehicle. This will cause the microprocessor to restart itself and being the same process of executing all the steps in FIGS. 3-9.

Turning, lastly, to FIG. 9, the learn command was received at H as a special 100 millisecond pulse signal; and if received, it further requires that a test pin is engaged at 10, in FIG. 1. If the test pin is engaged, the motion sensor will listen for the next key fob transmission and will identify itself from that time forward as being associated with that particular key fob. The rest of FIG. 9 controls the diagnostic mode which is in the selftest mode that engages the high sensitivity operation that was previously discussed—all further overhead associated with that test mode. On either or both of the learn mode or the test mode, moreover, a test lamp L can be connected at test pin ii in FIG. 1. The test lamp L is usually a small LED diode lamp that will flash in response to learning its key fob code, or it will flash in response to receiving that key fob transmission again in normal operation. It may flash at a rate, for example, of once per second for a few seconds, visually indicating that it is sensing the presence of the very first key fob transmitter code that it learned; or it may flash two times per second, visually indicating that it has received the second key fob transmitter code that it has learned. Finally, it may flash three times per second, etc. indicating that it now received the third key fob customer transmitter that it has learned—the owner/operator being provided in this illustration with as many as three different key fobs associated with the system. Any number of duplicate keyfobs may be utilized, however, by the authorized owner/operator of the system.

In further summary of the philosophy of the technique and system of the present invention and its safeguards and energy conservation and improvement in "LoJack" or similar tracking activation time, it has been understood that, as before explained, the most serious limitation in the use of theft tracking systems, is the theft discovery time. The owner/customer has to determine or discover that their vehicle has in fact been stolen before the stolen vehicle recovery process can actually began. In many cases, as before stated, many hours or sometimes several days may be lost before the owner of the vehicle can begin the recovery process of the stolen vehicle because it is not even known that the vehicle has been stolen. The present invention thus serves as an early warning system to alert the owner that the vehicle has indeed been moved without authorization. In practice, the owner will get a phone call on the home phone, office phone or cellphone or pager or e-mail system, to provide an alert within a few minutes of sensing by the present
invention, —certainly within 30 minutes—that the vehicle has been moved without authorization or at least without the presence of the key fob. The invention will therefore substantially enhance the stolen vehicle recovery rate and improve the stolen vehicle recovery system, allowing the police to aid in the crime prevention and crime fighting activities, even more effectively than currently.

In further summarization, the time sequences provided in the system of the invention include the rate at which the customer key fob sends a transmitter signal—set, in this description, at a rate to be approximately 1 minute, preferably 90 seconds. It might be longer, say, two minutes or so. It is designed such that the receiver in the motion sensor will periodically determine that the key fob is indeed present. The period is determined to make sure that the signal is transmitted only as much as necessary, but not so often that it degrades the battery in the key fob transmitter to the point where it becomes a nuisance to keep the battery replaced. As before exemplarily described, the key fob battery should last approximately a year as a marketable time frame. The time delay in the motion sensor is such that, upon receiving the key fob transmissions in its vicinity, the motion sensor will then disable itself for, say, five minutes within which acceleration will not be tested. This is preferably done, even though the key fob is transmitting at the rate of once per minute or once every 90 or every 120 seconds, so that, as before explained, in case there is any radio-frequency interference that prevents receiving a particular transmission, one or two transmissions can be missed and still the circuit may be maintained disabled because the key fob is actually within the proximal vicinity of the vehicle receiver and it is still an authorized situation.

The time that is required for the circuit to go into low-power mode, as previously suggested, is exemplarily 10 minutes, and that 10 minutes is counted from the time there is absolutely no motion, indicating that the vehicle is not moving. Since the vehicle is not moving, there is no sense further monitoring motion, authorized or unauthorized. So, the power is shut down to the circuits that consume the most energy, namely, the accelerometer devices themselves. Any movement in the piezo device P, FIG. 1, as previously mentioned, will subsequently wake up the microprocessor circuit and engage all the circuitry again, including the receiver RX. There is a further amount of time to be considered after, say, eight hours of not receiving the key fob transmissions, wherein the system may properly stop triggering the host device. It can be assumed at that point that the system has either been abandoned by the customer, or the key fob transmitter is malfunctioning or the batteries are dead; and this step may be instituted just to eliminate nuisance signals on radio-frequency channels.

A preferred key fob transmission sequence will now be more fully described. The transmission sequence is repeated 4 times when the program is awakened up by the hardware timer at approximately 90 second intervals. It consists of four parts:
1) Power Stabilization Delay. This delay, as earlier stated, is 100 msec. When the program is awakened and 50 msec. in between each transmission sequence.
2) Sequence Preamble. This is a sequence of alternating zeroes and ones to establish signal synchronization between the transmitter and receiver. It consists of 12 sets of "0->1" transitions at the elemental time period. The nominal elemental time period is 400 usec. The total time of this part is 9.6 msec.
3) Bit Time Synchronization. This is a sequence of 10 "0" states at the elemental time period in order to establish the length of the time period between transmitter and receiver. The total time of this part is 4.0 msec.
4) Data. The data sequence consists of 24 bits, of which the first four are flags, the first being the battery indication of the transmitter and the other three undefined. The last 20 bits of the data are the address of the transmitter. Each data bit consists of three parts. The first part is one elemental time period of "1". The second is the actual state of the data bit for one elemental time period. The last part is one elemental time period of "0". The total time of this part is 28.8 msec.

The total time of each individual transmission is 92.4 msec, in this illustrative example; and total time of the transmission sequence is 219.6 msec.

Reviewing again, the modes of operation of the system of the invention, they are
1) Normal Mode. This mode performs normal monitoring of the motion sensor and looks for valid messages from "learned" transmitters. When a valid message is received from a learned transmitter a 255 second (4 min. 15 sec.) timer is started, during which the generation of a motion alarm is inhibited. After receiving a valid message, the LED flashes according to the transmitter that was learned (see the later described learn mode for details on how the LED is flashed. Afterward, while the timer is active (i.e. motion alarms are inhibited), the LED is on solid.

The motion sensor is monitored in low sensitivity mode by sampling the state of the sensor 100 times per second and recording the number of times the sensor was active during the last second in a 60-element array, which provides coverage for the last minute. Every second the count for the current second is stored in the array replacing the oldest element, which provides a sliding window, and the total of the counts is computed. If, as before explained, it is greater than 50% of the maximum, then a motion alarm is generated. For example, the maximum number of counts in 1 minute is 6000 (60*100). If the sum of all counts in the array is greater than 3000 then a motion event has been received. At this point a timer is started, unless it is already running, to delay the generation of a motion alarm. The timer waits 240 seconds to allow a valid message from a learned transmitter or a command to enter the Learn mode or Diagnostic mode to stop the motion alarm from being generated. The system may be designed to require a minimum number of motion events during the delay period before generating the alarm.

When a motion alarm is generated from the normal mode, an 8 hour timer is started. If the timer expires without being reset, then generation of motion alarms is disabled. The timer is reset whenever a valid message is received from a learned transmitter, when the system enters the LEARN mode or it enters the diagnostic mode, now to be reviewed.

2) Learn Mode. This mode, as earlier mentioned, is used to "learn" transmitter addresses. It is entered when the system receives a 100 msec. signal (the range is 80->120 msec.), which starts a 60 second timer. While in this mode the LED visual indicator flashes at the rate of 1 second on 1 second off. If a transmitter address has been learned, the LED will flash according to the entry the address was stored in (1, 2, or 3) per second for 10 seconds. In other words, if the first transmitter is learned, the LED will flash once per second for ten seconds. If the second transmitter is learned, the LED will flash twice per second for ten seconds. If all three entries are in use when a new transmitter address is received, the oldest address, which is in entry 1, is deleted and entry 2 moves to entry 1, entry 3 moves to entry 2 and the new address is stored in entry 3 and the LED flashes 3 times per second for ten seconds.

At the completion of the LEARN mode (i.e. the 60 second timer has expired), the system reverts to the normal mode and the motion sensor array is cleared.

3) Diagnostic Mode. This mode is used to test the motion sensor. It is more of a command than a mode because the system does not stay in this mode but is only used to generate a test response to indicate whether the motion sensor has been sampled high since the last test command or power up. This mode is triggered when the system receives a 200 msec. signal (the range is 180->220 msec.). Upon received of this signal, the system sends either a test response with motion detected if the motion sensor was sampled high at any time since the last diagnostic command, or a test response with no motion detected if the motion sensor was not sampled high. Besides generating the test response, the system goes into High Sensitivity Mode.

Sensitivity

The system can set the motion sensor to high or low sensitivity. When operating in the normal mode the system uses low sensitivity. After receiving a command, the system will switch to high sensitivity until it detects the motion sensor has gone active. At this point it will revert to low sensitivity mode and start a 60 second delay before allowing alarms to be generated. The system will operate in high sensitivity mode when it powers up and will not be able to generate a motion alarm until 100 seconds after the motion sensor is detected active. After that, the system runs as described in normal mode.

While these illustrative specifications are preferred as a best mode design, further modifications will also occur to those skilled in this art, and such are considered to fall within the spirit and scope of the invention as defined in the appended claims.

What is claimed is:

1. A method of unauthorized vehicle motion sensing and alarm with the aid of in vehicle acceleration sensors, that comprises,
    monitoring the presence or absence of predetermined periodic radio-frequency pulse transmissions from an authorized source in the vicinity of the vehicle;
    in the event that such transmissions are present, receiving the transmissions in the vehicle; and
    disarming or de-activating the acceleration sensors;
    in the absence of such reception, arming or activating the acceleration sensors in the vehicle to test for any acceleration of the vehicle by unauthorized motion thereof over predetermined time period samples;
    in the event such vehicle acceleration is detected by the accelerator sensors, sending a wireless alarm message for so informing the vehicle owner;
    after a further predetermined longer period of time during said activating of the acceleration sensors wherein no motion of the vehicle has been detected, disarming or deactivating the acceleration sensors to put them in a sleep mode and conserve activation energy;
    upon the advent of vibration detection at the vehicle during such sleep mode, awakening and re-arming or re-activating the acceleration sensors;
    and again disarming or de-activating the acceleration sensors upon the later advent of the reception of said transmissions in the vehicle.

2. The method of claim 1 wherein the acceleration sensors sense all directions of motion of the vehicle.

3. The method of claim 2 wherein orthogonal-axis accelerator sensors are mounted in the vehicle.

4. The method of claim 1 wherein the radio-frequency pulse transmissions are coded for predetermined authorized users and such are validated as received in the vehicle.

5. The method of claim 1 wherein, in the absence of receipt of said radio-frequency pulse transmissions, the acceleration sensors are monitored by sampling their outputs at about a 100 millisecond period rate.

6. The method of claim 5 wherein if motion is detected over about a one second interval or so, for more than half the timing of the millisecond samples, said alarm message is sent.

7. The method of claim 5 wherein said longer predetermined period of time is of the order of about 10 minutes or so.

8. The method of claim 7 wherein after the elapse of still a longer period of time of the order of hours, the vehicle motion sensing and alarm system become dormant, only to automatically reactivate itself upon receipt of said radio-frequency pulse transmissions.

9. The method of claim 1 wherein a test mode is provided in which a request signal is sent for validating to host devices that the acceleration sensors are functioning.

10. The method of claim 1 wherein a learn mode is provided in which each unique code of different users is learned and visually indicated.

11. Apparatus for unauthorized vehicle motion sensing and alarm having, in combination, a vehicle-carried radio receiver for monitoring the presence or absence of predetermined periodic radio-frequency pulse transmissions from an authorized source in the vicinity of the vehicle;
    microprocessor-controlled vehicle acceleration sensors carried by the vehicle and responsive in the absence of reception of said transmissions by the receiver, for reception of said transmissions by the receiver, for arming or activating the acceleration sensors in the vehicle to test for any acceleration of the vehicle by unauthorized motion thereof over predetermined time period samples;

in the event such vehicle acceleration is detected by the accelerator sensors, means for sending a wireless alarm message for so informing the vehicle owner;

the microprocessor, after a further predetermined longer period of time during said activating of the acceleration sensors wherein no motion of the vehicle has been detected, controlling the disarming or deactivating of the acceleration sensors to put them in a sleep mode and conserve activation energy, and further operable, upon the advent of vibration detection at the vehicle during such sleep mode, for awakening and re-arming or re-activating the acceleration sensors; and means controlled by the microprocessor for again disarming or de-activating the acceleration sensors upon the later advent of the reception of said transmissions in the vehicle by said receiver.

12. The apparatus of claim 11 wherein the acceleration sensors sense all directions of motion of the vehicle.

13. The apparatus of claim 12 wherein orthogonal-axis accelerator sensors are mounted in the vehicle.

14. The apparatus of claim 11 wherein the radio-frequency pulse transmissions are provided by a user-carried transmitter, as on a key fob, and such are coded for predetermined authorized users, with the receiver validating such in the vehicle.

15. The apparatus of claim 11 wherein, in the absence of receipt of said radio-frequency pulses transmissions, means is provided for monitoring the acceleration sensors by sampling their outputs at about a 100 millisecond period rate.

16. The apparatus of claim 15 wherein if motion is detected over about a one second interval or so, for more than half the timing of the 100 millisecond samples, said alarm message is sent.

17. The apparatus of claim 15 wherein said longer predetermined period of time is of the order of about 10 minutes or so.

18. The apparatus of claim 17 wherein after the elapse of still a longer period of time of the order of hours, the vehicle motion sensing and alarm system become dormant, only automatically to reactivate itself upon receipt of said radio-frequency pulse transmissions.

19. The apparatus of claim 11 wherein a test mode is provided in which a request signal is sent for validating to a host device that the motion sensors are functioning.

20. The apparatus of claim 11 wherein a learn mode is provided in which each unique code of different users is learned and visually indicated.

21. The apparatus of claim 15 wherein means is provided for a safety delay to accommodate interference or other blocking of the transmitted pulses.

* * * * *